(12) United States Patent
Reijersen Van Buuren

(10) Patent No.: US 11,178,822 B2
(45) Date of Patent: Nov. 23, 2021

(54) APPARATUS AND METHOD FOR FORMING AND QUICKLY WRAPPING A BALE IN A BALE FORMING CHAMBER

(71) Applicant: FORAGE INNOVATIONS B.V., Maassluis (NL)

(72) Inventor: Willem Jacobus Reijersen Van Buuren, Maassluis (NL)

(73) Assignee: FORAGE COMPANY B.V., Maasslus (NL)

( * ) Notice: Subject to any disclaimer, the term of this patent is extended or adjusted under 35 U.S.C. 154(b) by 406 days.

(21) Appl. No.: 15/542,337

(22) PCT Filed: Jan. 8, 2016

(86) PCT No.: PCT/NL2016/050014
§ 371 (c)(1),
(2) Date: Jul. 7, 2017

(87) PCT Pub. No.: WO2016/114652
PCT Pub. Date: Jul. 21, 2016

(65) Prior Publication Data
US 2018/0310482 A1  Nov. 1, 2018

(30) Foreign Application Priority Data
Jan. 16, 2015 (NL) ..................................... 2014142

(51) Int. Cl.
*A01F 15/07* (2006.01)
(52) U.S. Cl.
CPC .... *A01F 15/0715* (2013.01); *A01F 2015/076* (2013.01)

(58) Field of Classification Search
CPC ............ A01F 15/0715; A01F 2015/076; A01F 2015/0725; A01F 15/07; A01F 2015/072; A01F 15/071
(Continued)

(56) References Cited

U.S. PATENT DOCUMENTS 4,407,113 A * 10/1983 Core ................... A01F 15/0715
  53/118
4,697,402 A * 10/1987 Anstey ................ A01F 15/0715
  53/118
(Continued)

FOREIGN PATENT DOCUMENTS

EP  1 808 065 A1  7/2007
EP  2 700 297 A2  2/2014

OTHER PUBLICATIONS

International Search Report, issued in PCT/NL2016/050014, dated May 11, 2016.
(Continued)

*Primary Examiner* — Sameh Tawfik
(74) *Attorney, Agent, or Firm* — Birch, Stewart, Kolasch & Birch, LLP

(57) ABSTRACT

An apparatus and a method for forming and wrapping a bale in a bale forming chamber into wrapping material includes a wrapping material conveying device that conveys a web of wrapping material towards a wrapping material inlet. A severing device severs the web at a severing location. The wrapping material conveying device moves the web towards the inlet, forms a leading segment of the web, and keeps the leading segment in an intermediate web providing position between the wrapping material inlet and the severing location without moving the leading segment. For starting the wrapping procedure, the web is conveyed towards the inlet.

11 Claims, 9 Drawing Sheets

(58) Field of Classification Search
USPC .................. 53/399, 118, 389.1, 389.4, 587
See application file for complete search history.

(56) References Cited

U.S. PATENT DOCUMENTS

| | | | | |
|---|---|---|---|---|
| 5,020,299 A * | 6/1991 | Underhill | ............ | A01F 15/0715 53/399 |
| 5,129,207 A | 7/1992 | Butler | | |
| 5,129,208 A | 7/1992 | Van Zee | | |
| 5,216,873 A * | 6/1993 | Ratzlaff | ............. | A01F 15/0715 53/118 |
| 5,219,208 A * | 6/1993 | Liao | ............. | E21C 35/223 261/116 |
| 5,243,806 A * | 9/1993 | Jennings | ............ | A01F 15/0715 53/118 |
| 5,311,729 A * | 5/1994 | Viaud | ................ | A01F 15/0715 100/88 |
| 5,479,767 A * | 1/1996 | McClure | ................ | A01F 15/07 100/15 |
| 5,631,826 A * | 5/1997 | Chow | .................. | A01F 15/071 100/4 |
| 5,916,109 A * | 6/1999 | Espinosa | ................ | B65B 41/16 53/141 |
| 6,021,622 A * | 2/2000 | Underhill | ............ | A01F 15/0715 53/118 |
| 6,233,913 B1 * | 5/2001 | Roth | ................... | A01F 15/0715 100/88 |
| 6,928,792 B1 * | 8/2005 | Viesselmann | ....... | A01F 15/0715 220/557 |
| 6,971,220 B1 * | 12/2005 | Rampp | ................ | A01F 15/071 53/216 |
| 7,322,167 B2 * | 1/2008 | Chapon | .............. | A01F 15/0715 53/118 |
| 7,409,814 B2 * | 8/2008 | Hood | .................. | A01F 15/0715 100/4 |
| 7,644,563 B2 * | 1/2010 | De Gersem | ......... | A01F 15/0715 53/118 |
| 8,434,289 B2 * | 5/2013 | Smith | ................. | A01F 15/0715 53/118 |
| 8,516,779 B2 * | 8/2013 | Bennett | .............. | A01F 15/0715 53/116 |
| 9,474,212 B2 * | 10/2016 | Paillet | ................ | A01F 15/0715 |
| 2003/0115841 A1 * | 6/2003 | Davis | ................. | A01F 15/0715 53/587 |

OTHER PUBLICATIONS

Written Opinion of the International Searching Authority, issued in PCT/NL2016/050014, dated May 11, 2016.

* cited by examiner

APPARATUS AND METHOD FOR FORMING AND QUICKLY WRAPPING A BALE IN A BALE FORMING CHAMBER

FIELD OF THE INVENTION

The invention refers to an apparatus and a method for forming in a bale forming chamber a bale from loose material and for wrapping the bale in the bale forming chamber, in particular for forming in a drum-shaped bale forming chamber a round-cylindrical bale from loose agricultural crop material and for wrapping the formed bale in the chamber into a net or a plastic sheet.

BACKGROUND OF THE INVENTION

A bale forming apparatus (baler) according to the invention forms under pressure a bale in a bale forming chamber. Such a baler is in particular used for agricultural purposes. Before the baler ejects the formed bale out of the bale forming chamber, a part of the bale's surface, e.g. the circumferential surface of a round bale, is wrapped in the bale forming chamber into a web of wrapping material, e.g. into a web of net or of plastic sheet. If the bale were not be wrapped in the bale forming chamber, it would fall apart after being ejected.

A required number of layers of wrapping material are placed around the bale in the bale forming chamber. Afterwards the web of wrapping material is severed at a severing location outside of the bale forming chamber. The wrapped bale is ejected out of the bale forming chamber. A further bale can be formed and wrapped in the bale forming chamber.

In order to wrap the bale, the web has to be conveyed towards a wrapping material inlet guiding into the bale forming chamber and has to be injected into the bale forming chamber where the web is taken by the rotated or otherwise moved bale. Several approaches how to convey the web have been published.

The bale forming apparatus 200 of EP 1808065 A1 forms a round-cylindrical bale 400 in a drum-shaped bale forming chamber and wraps the bale 400 in the bale forming chamber by means of a wrapping device 100, cf. FIG. 1. A web 1 of a net is taken from a supply reel 10 and is guided around a spreader roller 24 and a drive roller 21, cf. FIG. 2. A leading segment 11 of the web 1 sags 21. The lever arms 32 are pivoted from a receiving position 6 to a position near a wrapping material inlet 5. This movement causes the plate 31 to shift and move the leading segment 11 of the web 1 towards the inlet 5. The web 1 is injected through the inlet 5 and is clamped between a roller 206 below the inlet 5 and the rotated bale 400. The web 1 is pulled into the bale forming chamber. On its way from the reel 10 to the inlet 5 the web 1 is guided over the plate 31, cf. FIG. 3. The drive roller 21 supplies the web 1 at small discrete intervals, cf. par. [0087]. The feeding means 2 comprising the driven rollers 21 supplies additional net if the rotated bale 400 cannot yet drag the net 1, cf. par. [0090]. It is therefore possible that the web 1 is conveyed stepwise towards the inlet 5.

Often a high throughput through the baler is desired. The wrapping process should take as little time as possible. Several proposals were made how to achieve this goal.

U.S. Pat. No. 7,409,814 B2 discloses a method for automatically initiating the step of wrapping a bale in a pressing chamber. The bale is wrapped into wrapping material, e.g. into net wrap material 190. A desired bale size is given by the operator, cf. step 504 of FIG. 2. A bale size sensor measures the currently achieved bale size and yields a bale size signal 508. This actual bale size signal 508 is compared with the desired bale size. In addition the operator can select an advance time 502 which serves as the delay time. If the measured actual bale size 508 reaches the desired bale size 504, a wrap cycle is initiated (step 524). After the delay time 502 given by the operator has passed (step 526), an alarm is generated and is communicated to the operator (step 540). This alarm informs the operator to manually stop the baler, step 550. The net wrap material 190 is pulled from a supply reel which is mounted at the tailgate of the baler. The wrap material 190 is moved to the exit side 154 of a throat (inlet 150) at the front side of the baler. In an alternative embodiment (FIG. 6) the operator selects a pre-start amount 802, e.g. 5 inches, and a desired bale size 804, e.g. 60 inches. As soon as the actual bale size 504 reaches the required bale size 804 minus the pre-start amount 802, e.g. the actual bale size reaches 60−5=55 inches, the wrap cycle is initiated (step 824). The alarm for the operator is generated as soon as the actual bale size reaches the required bale size 804, step 840. The operator stops the baler travel, step 850.

The baler 10 of U.S. Pat. No. 5,129,207 comprises a wrap material dispensing system 34 mounted at the lower rear portion of the baler 10, cf. FIG. 1. A wrapping material supply system 36 unrolls wrapping material 39 from a supply roll 40 and supplies wrapping material 39 to a conveying assembly 38. This conveying assembly 38 cooperates with several bale-forming belts 12 which are arranged around the pressing chamber for forming and wrapping a bale 14. The conveying assembly 38 and the belts 12 together are arranged to convey wrap material. Two pinch rollers 62, 64 advance wrapping material 39 from the supply roll 40. The conveying assembly 38 conveys wrapping material 39 by means of several parallel conveying belts 88 which are guided around rollers 82 to 86, cf. FIG. 2. The bale-forming belts 12 engage the wrapping material conveying belts 88 and drive them. The wrapping material 39 is guided through an entryway 102 into the space between the belts 12 and 88 until the leading edge of the wrapping material 39 reaches the roller 84 and is guided by a curved guiding element 104 towards the pressing chamber and is injected into the pressing chamber.

In U.S. Pat. No. 5,129,208 a baler 10 with several bale-forming belts 20 and with a bale wrap feed apparatus 26 is described. The wrap feed apparatus 26 is mounted on a lower, rearward portion of the tailgate 16. Two web feed rollers 44 and 46 together grip the web 40 of wrapping material and pull the web 40 from a roll 28. The web feed roll 46 is driven via a V-belt 54 which is guided around pulleys 50 and 52, cf. FIG. 4. The web 40 is further conveyed by several parallel web feed belts 32 guided around rollers 34, 36, 38. A toggle roller 122 mounted between two toggle plates 124 tensions the web feed belts 32 and shifts them against the bale-forming belts 20. The plates 124 with the toggle roller 122 can be pivoted between a drive position and a release position around a pivoting axis 126 by two cylinders 128, cf. FIG. 2 and FIG. 3. A belt guide rack 98 with several separator fingers 96 can be pivoted into an upper position in which the fingers 96 engage between bale-forming belts 20 and into a lower position below the web feed belts 32.

SUMMARY OF THE INVENTION

A problem solved by the invention is to provide a bale forming and wrapping apparatus and a bale forming and wrapping method wherein the apparatus and the method need less time for wrapping a bale into a web of wrapping material than known balers require.

This problem is solved by a bale forming and wrapping apparatus and a bale forming and wrapping method as set forth in the independent claims. Preferred embodiments are specified in the depending claims.

The bale forming and wrapping apparatus according to the invention comprises
- a material injecting device,
- a bale forming means, and
- a wrapping apparatus.

The wrapping apparatus comprises
- a wrapping material conveying device and
- a severing device.

The bale forming means provides a bale forming chamber. The material injecting device is arranged to inject loose material into this bale forming chamber. The bale forming means is arranged to form from injected loose material a bale in the provided bale forming chamber.

A wrapping material inlet leads into the bale forming chamber. The wrapping apparatus is arranged to inject a web of wrapping material into the bale forming chamber through this wrapping material inlet.

The wrapping material conveying device is arranged to convey a web of wrapping material towards the wrapping material inlet. The severing device is arranged to sever a web of wrapping material at a severing location. This severing location is positioned outside of the bale forming chamber.

The bale forming and wrapping apparatus according to the invention operates as follows:
- The material injecting device injects loose material into the bale forming chamber.
- The bale forming means forms from injected loose material a bale in the bale forming chamber.
- The wrapping material conveying device conveys the web past the severing location and towards the wrapping material inlet such that a leading segment of the web is formed. This leading segment is formed in a web providing step. The term "leading" and "past" refer to the conveying direction in which the web is conveyed. The leading segment begins in the leading edge of the web and reaches to the severing location.
- The conveying of the web is interrupted before the web reaches the wrapping material inlet.
- As the web conveying is interrupted, the wrapping material conveying device holds the leading segment in an intermediate web providing position between the severing location and the wrapping material inlet, i.e. downstream from the severing location—seen in the conveying direction of the web. The leading segment is temporarily held without being conveyed. The entire leading segment is still kept outside of the bale forming chamber such that a distance to the wrapping material inlet occurs.
- Loose material is injected into the bale forming chamber and the bale increases until the wrapping procedure starts, i.e. also while the leading segment is held in the intermediate web providing position. The web conveying is therefore interrupted before a given wrapping start condition is fulfilled and the wrapping procedure is triggered.
- Subsequently the web including the leading segment formed by the web providing step is further conveyed towards the wrapping material inlet and is injected through the wrapping material inlet into the bale forming chamber. This movement towards the wrapping material inlet is performed in at least one web injecting step.
- The bale in the bale forming chamber is wrapped into the injected web.
- Subsequently the severing device severs the web of wrapping material at the severing location.

ADVANTAGES

In particular in the case of a bale formed from loose agricultural material which is to be used as fodder the baler which wraps the bale in the bale forming chamber is a part of an agricultural harvester, i.e. a vehicle. The wrapping procedure should fulfill the following conditions:
- The wrapping material should not enter the bale forming chamber before the bale is readily formed.
- After having started the wrapping process, it must be avoided that a huge amount of loose material to be pressed is injected into the bale forming chamber simultaneously with wrapping material.

If these constraints are fulfilled, the wrapping material indeed covers a part of the bale's surface and is not significantly mixed with or hidden by loose material. If one of these constraints is not fulfilled, wrapping material will be mixed with loose material in the bale while the bale is formed. In particular if this bale serves as fodder for an animal, this mixture is undesired. It would be difficult to remove the web from the bale.

The apparatus and the method according to the invention cope with these constraints.

In conventional balers as well as in a baler according to the invention the web of wrapping material is severed at the severing location after the bale in the bale forming chamber is entirely wrapped. The wrapped bale can now be ejected out of the bale forming chamber. A remaining web of wrapping material extends from a reservoir for wrapping material, e.g. from a supply reel, to the severing location. In the bale forming chamber a further bale can be formed and wrapped into the remaining web. After wrapping the further bale and severing the web, a new leading edge of the remaining web is formed at the severing location.

The severing location is positioned outside of the bale forming chamber. Therefore a distance between the bale in the bale forming chamber and the severing location occurs. The severing device can therefore be positioned spaced apart from the loose material in the bale forming chamber. It is possible to mount the severing device at a casing surrounding the bale forming chamber.

In conventional balers the remaining web is hold in a parking position reaching from the severing location back to a reservoir until a wrapping start condition for the bale formed in the bale forming chamber is fulfilled and the wrapping procedure commences. This wrapping start condition triggers the step that the web is conveyed towards the wrapping material inlet and afterwards into the bale forming chamber. In addition the event that the wrapping start condition is fulfilled causes the step that no further loose material is injected in to the bale forming chamber, e.g. by stopping the baler or guiding the loose material into a buffering chamber until the wrapped bale is ejected out of the bale forming chamber.

In conventional balers a leading part of the web in the parking position extends from the reservoir to the severing location with its leading edge at the severing location. This leading part is kept in this parking position until the wrapping start condition is fulfilled. Until the wrapping start condition is fulfilled the entire leading part of the web is held in the parking position upstream of the severing device—upstream seen in the conveying direction in which the web of wrapping material will later be conveyed towards the wrapping material inlet. After the wrapping start condition for the bale in the bale forming chamber is fulfilled, the web has to be conveyed along the entire path from the severing location to the wrapping material inlet. This requires time. The wrapping start condition depends on the progress made during the bale forming process, in particular from the amount of loose material already injected into the bale forming chamber and from the actual pressure onto the loose material in the bale forming chamber. The bale in the bale forming chamber can significantly increase while the web is conveyed along the entire path until no further loose material is injected into the bale forming chamber. Interrupting the material injection too early reduces the throughput through the baler.

If no further loose material is injected into the bale forming chamber while the web is conveyed along the entire path, the regular baler operation needs to be interrupted or the baler requires a buffering storage for this loose material. If the bale has no such buffering storage and if it is possible that further loose material is injected while the web is conveyed along the entire path, the following problem can occur: The amount of loose material injected while the web is conveyed along the entire path can hardly be predicted, in particular if the baler belongs to an agricultural harvester and is moved over ground. This amount influences the bale size. The more loose material is injected, the larger is the formed bale. Therefore the actual size of the bale can differ from a required final bale size as it is not possible to control the amount of loose material injected into the bale forming chamber while the web is conveyed along the entire path. A further reason for a deviation of the actual bale size from a required size is: The actual conveying speed of the web may differ from a scheduled speed, e.g. due to slippage. Therefore the time required for conveying the web can vary from bale to bale.

According to the invention, however, the wrapping apparatus with the wrapping material conveying member forms a leading segment of the web of wrapping material in advance, i.e. before a given wrapping start condition is fulfilled. The wrapping material conveying device holds this leading segment in the intermediate web providing position without moving or severing the web until the wrapping start condition is fulfilled. This leading segment is positioned downstream from the severing location, i.e. between the severing location and the wrapping material inlet. The terms "upstream" and "downstream" refer to the conveying direction in which the web of wrapping material is conveyed towards the wrapping material inlet. Further loose material can be injected into the bale forming chamber while the leading segment is kept without being moved.

Thanks to the invention the leading segment in the web providing position is formed before or/and while a bale is formed in the bale forming chamber. The formation of the leading segment is completed before the bale formation is entirely completed, i.e. before the bale reaches the final bale size, and before the given wrapping start condition is fulfilled. It is possible to inject further loose material into the bale forming chamber while the leading segment is formed and while the leading segment is kept in the intermediate web providing position. The leading segment kept in the intermediate web providing position is kept in a distance to the bale forming means and to the bale forming chamber such that neither a rotated or otherwise moved bale nor debris in the bale forming chamber nor the bale forming means touches and conveys or damages the leading segment kept in the intermediate web providing position. The step of forming the leading segment does not decelerate the process of forming the bale.

When the wrapping start condition is fulfilled, the web is further conveyed and is injected through the wrapping material inlet into the bale forming chamber. For injecting the web into the bale forming chamber the web needs not be conveyed over the entire distance (entire path) from the severing location to the wrapping material inlet but only over a reduced distance, namely from the leading edge of the leading segment having been kept in the web providing position to the wrapping material inlet. This reduced distance equals the entire distance from the severing location to the wrapping material inlet reduced by the length of the leading segment kept in the intermediate web providing position. Therefore the invention saves conveying time and thereby time for the wrapping process. A part of the web conveying is performed before the wrapping start condition is fulfilled.

In addition it is not necessary to provide a buffering storage. It is further not necessary to interrupt the regular baler operation after the conveying of the web is started. The required time span for conveying the web from the intermediate web providing position to the wrapping material inlet can be made short such that nearly no further loose material is injected while the or every web injecting step is performed. The bale in the bale forming chamber substantially remains its size while the web is conveyed to the wrapping material inlet. Therefore the actual bale size is significantly equal to a required bale size. The invention helps to form a bale of a required bale size without reducing the throughput.

A baler according to the invention fulfills one constraint mentioned above, namely that the wrapping material should not enter the bale forming chamber before the bale is readily formed, e.g. reaches the final bale size. This goal is achieved as the leading segment is held in the intermediate web providing position and is thereby kept outside of the bale forming chamber without being moved until the given wrapping start condition is fulfilled.

The other constraint, i.e. that no or only few loose material should be injected into the bale forming chamber after the wrapping material has been injected into the bale forming chamber, is in particular achieved as the web is only conveyed over a shorter path (compared with conventional balers) such that the conveying of the web requires only little time (from the web providing position to the wrapping material inlet) after the wrapping start condition is fulfilled. Usual measures for fulfilling the other constraint, e.g.

interrupting the injection of further loose material into the bale forming chamber after starting the wrapping procedure or guiding further loose material into a buffering storage or a further bale forming chamber (non-stop baling or continuous baling), can be triggered later and needs only to be performed over a shorter time span.

According to the invention the wrapping material conveying device holds the leading segment in the intermediate web providing position without moving the leading segment until a given wrapping start condition is fulfilled. The leading segment is kept in the web providing position outside of the bale forming chamber. Thanks to the invention it is possible to create this leading segment by conveying the web from the severing location towards the wrapping material inlet in an arbitrary time period between the following two events:

The web is severed at the severing location after the previous bale in the bale forming chamber is entirely wrapped and can be ejected.

The current bale is readily formed and has to be wrapped, i.e. the web should enter the bale forming chamber.

These events can automatically be detected by usual sensors. As long as the constraint is fulfilled that the formation of the leading segment has to be performed entirely between these two events, it is not necessary to synchronize the creation of the leading segment outside of the bale forming chamber with the formation of the increasing bale in the bale forming chamber or with a travel over ground of a vehicle carrying the baler. The conveying velocity for forming the leading segment can be arbitrarily selected. In particular it is possible to convey slowly the web for forming the leading segment such that less energy is required.

Thanks to the invention it is possible but not necessary to predict in advance when the increasing bale size will reach the required bale size or when a further given wrapping start condition will be fulfilled. In general the wrapping start condition fulfillment depends on the current size and/or on a further parameter of the increasing bale in the bale forming chamber or on the geo-position of a vehicle carrying the baler or on the inclination of the ground. The current bale size or further bale parameter depends on the amount of loose material injected into the bale forming chamber and cannot precisely be predicted in advance, in particular if the baler belongs to a vehicle which is moved over ground and picks up loose material from the ground. The amount per time of loose material injected into the bale forming chamber can significantly vary over time.

In some conventional balers the step of conveying the web from the severing location to the wrapping material inlet is started in a defined time span before the bale reaches the required final size or before a further bale completion condition is expected to be fulfilled, e.g. 5 sec before this event. Within this time span the web has to be conveyed from the severing location to the wrapping material inlet. Due to process variations the web may reach the wrapping material inlet too early or too late, i.e. at another time point than predicted. The invention saves such a prediction step and avoids this possible error. It is possible to stop the injection of loose material and to trigger the web injecting step when the bale has reached the final bale size nearly without reducing the throughput. In addition the invention saves a sensor which otherwise may be necessary for predicting when the bale will reach the required final bale size, e.g. a mass flow sensor which is used for predicting the future increase of the bale diameter.

Thanks to the invention it is possible but not necessary to start the wrapping procedure after the bale in the bale forming chamber has already reached the required final bale size. This late start consumes time. It is further possible but not necessary to synchronize the step of conveying the web past the severing location with the progress of the bale formation.

The invention provides a baler which can form bales with a smaller difference between the actual bale size and a required bale size. In the case of a round-cylindrical bale the actual bale diameter can be kept close to a required final bale diameter. This advantage is in particular achieved as the web has to be conveyed over a shorter distance from the intermediate web providing position to the wrapping material inlet—compared with conventional balers. The corresponding web injecting step requires less time and can be triggered by the event that the bale size has reached a given threshold (final size or smaller size). In the short time span required for performing the or every web injecting step no or only little amount of further loose material is injected into the bale forming chamber. The bale size remains substantially constant from bale to bale.

The invention can easily be implemented on an existing baler. No additional human interaction is necessary for performing the method according to the invention. The required mechanical parts, in particular the wrapping material conveying device and a control unit, are in general already mounted on board of the baler. If at all, only few mechanical amendments are necessary. Often it suffices to amend a baler control unit which receives sensor signals and controls the operation of the wrapping apparatus. In particular that control unit is to be adapted which controls those wrapping apparatus parts which convey the web towards the wrapping material inlet. In general the required amendments can be achieved by amending control software implemented on the control unit. In some cases it is even not necessary at all to change a mechanical or hydraulic part already mounted on board of the baler or to add a part or to change the control unit hardware. In particular the existing wrapping apparatus with its actuators can further be used.

Amending control software implemented on the control unit, i.e. updating control software, can often be performed in an automated manner and/or via a wireless data connection in a maintenance break, even on an agricultural field. The baler needs not to be transported to a workshop. Controlling the wrapping apparatus in an adapted manner according to the invention enables the wrapping apparatus to hold the leading segment in the web providing position.

Preferred Embodiments

According to the invention loose material is injected into the bale forming chamber while the leading segment is kept in the intermediate web providing position. Preferably loose material is injected until the bale in the bale forming chamber reaches a given required final bale size. In the case of a round-cylindrical ale the bale size is in general the bale diameter. The leading segment is formed and is kept in the intermediate web providing position before the bale reaches the final bale size. As further loose material is injected, the bale size increases while the leading segment is kept.

In one embodiment an area of the bale's surface is wrapped into the injected web, e.g. the entire circumferential surface of a round-cylindrical bale, wherein the front faces remain unwrapped. In a further embodiment the entire bale surface is wrapped in the bale forming chamber.

Preferably the leading segment kept in the intermediate web providing position has a length which is more than half the length of the entire web conveying path from the severing location to the wrapping material inlet. The leading segment length can even be more than three quarter or even more than 90% of this path length. This embodiment further saves time for conveying the web after a wrapping start condition is fulfilled.

In one embodiment exactly one web injecting step is performed. After the wrapping procedure is triggered, the web is conveying towards and injected into the bale forming chamber in a continuous movement, i.e. without a further interruption.

In a further embodiment the web is conveyed in a start-stop operation after the wrapping procedure is triggered. The web is conveyed stepwise towards the wrapping material inlet. This embodiment can be denoted as performing several web injecting steps. A sequence with several web injecting steps is performed. It is possible that the execution of a further web injecting step is repeated until it is detected that the bale and the bale forming means together have clamped the injected web and convey it.

In one implementation the leading segment is formed in the web providing step without a pause. In a further implementation a first part of the leading segment is formed in a first phase of the web providing step. A pause occurs after this first phase. Subsequently the web is further conveyed and the entire leading segment is formed in a second phase of the web providing step. With other words: The web providing step is divided into at least two phases. It is possible that the leading segment is formed in a start-stop operation. Also in this implementation further loose material can be injected while a phase of the web providing step is performed and/or in the pause between two phases.

In one embodiment of conveying the web the bale forming means itself and a moveable wrapping material opposing member jointly clamp the web of wrapping material. The clamped web is conveyed towards the wrapping material inlet. In one implementation the wrapping material opposing member presses the web towards the outer surface of at least one pressing belt belonging to the bale forming means.

The embodiment with the opposing member can be used only for the web providing step or additionally for the or for at least one web injecting step. The wrapping material opposing member can keep the leading segment in the intermediate web providing position in a distance to the bale forming means. It is possible but not necessary that the wrapping material opposing member comprises an own drive for mowing the web. It suffices that the wrapping material opposing member presses the web against the driven bale forming means.

In one implementation the wrapping material opposing member comprises a guiding sheet or at least one traversal bar. In a further implementation it comprises a driven or idler web conveyor member, e.g. at least one endless web conveying belt. In both implementations the wrapping material opposing member is positioned outside of and preferably below the bale forming chamber.

These implementations can be combined, e.g. as follows: The web is conveyed by the bale forming means and the opposing member and is additionally guided by a guiding sheet positioned downstream of the opposing member.

The wrapping material opposing member is preferably moveable between
  a conveying position in which the wrapping material opposing member presses the web against the bale forming means and
  a holding position in which a distance between the wrapping material opposing member and the bale forming means occurs.

For conveying the web it is clamped between the wrapping material opposing member being in the conveying position and the bale forming means. In this embodiment the opposing member does not need to comprise an own drive for moving the web but just an actuator which moves the opposing member from one position into the other position. The bale forming means moves the bale and additionally conveys the web. This kind of conveying can be used in the web providing step as well as in the web injecting step.

In one implementation the bale forming means comprises at least one driven endless pressing belt which provides and surrounds at least partially the bale forming chamber. The wrapping material opposing member being in the conveying position presses the web against an outer surface of the pressing belt or of a further bale forming member. The outer surface of the pressing belt/bale forming member and the wrapping material opposing member together clamp and convey the web.

In the embodiment with the wrapping material opposing member the bale forming means and the wrapping material opposing member being in the conveying position jointly clamp and convey the web until the leading segment is formed.

For interrupting the step of conveying the web the wrapping material opposing member is moved into the holding position such that the web does no longer touch the bale forming means. Preferably the leading segment in the web providing position is kept by the opposing member being in the holding position. In one implementation the wrapping material opposing member being at least partially positioned below the bale forming chamber is moved away from the bale forming means into the holding position and keeps the leading segment in the intermediate web providing position. The force of gravity moves the leading segment away from the driven bale forming means and keeps it on the opposing member. A distance between the leading segment in the web providing position and the bale forming means occurs. Therefore the bale forming means does not contact and convey the leading segment while the leading segment is kept in the intermediate web providing position.

Later, namely when the step of starting the wrapping procedure triggers the or the first web injecting step, the wrapping material opposing member is moved towards the bale forming chamber and thereby back into the conveying position. The bale forming means and the wrapping material opposing member being moved back in the conveying position further convey the web towards the wrapping material inlet. This is performed in the web injecting step.

It is also possible that the wrapping material opposing member is only used in the web providing step, i.e. for forming the leading segment, and is used for keeping the leading segment in the web providing position. A further part of the wrapping material conveying device is used for conveying the web in the or every web injecting step. It is also possible that the wrapping material opposing member is only used in the or every web injecting step.

The wrapping material opposing member does not necessarily comprise an own drive for conveying the web—an actuator for moving the wrapping material opposing member between the two positions suffices. This position changing actuator does not need to provide large torque or large mechanical power and needs not to move the opposing member quickly. For forming the bale the bale forming means (pressing belts or pressing rollers) is driven. In addition the bale forming means moves the web as long as the wrapping material opposing member is in the conveying position.

Thanks to this embodiment no conveying device especially for driving the web is required. The bale forming means can continuously be driven. In particular it is not necessary to stop the bale forming means while the wrapping material opposing member in the holding position keeps the leading segment in the intermediate web providing position. Therefore the bale forming means can complete the bale formation in the bale forming chamber while the leading segment is kept in the intermediate web providing position.

In a further embodiment a wrapping material conveying member, e.g. at least one roller or conveyor belt, is positioned outside of the bale forming chamber and is selectively driven or stopped. When being driven this conveying member conveys the web. The conveying member always contacts the web. When being stopped the conveying member holds and keeps the leading segment in the web providing position. A distance between the bale forming means and the driven wrapping material conveying member occurs. It is possible that this distance is changed. But thanks to the feature that the conveying member is selectively driven or stopped this is not necessary This wrapping material conveying member can comprise a driven roller which is positioned outside of the bale forming chamber and which preferably has a circumferential surface with a high friction coefficient. In a possible implementation an idler roller or a further driven roller is biased against the driven roller. In a further implementation a further driven roller is biased against the driven roller with the high friction surface. The two rollers always clamp the web between them. As long as at least one roller is driven, the rollers together convey the clamped web. The embodiment with the opposing member can be combined with the embodiment comprising the conveying member.

In one implementation a power train connects one bale forming member, e.g. a driven pressing roller or a belt driving roller, with a driven wrapping material conveying roller. A controlled clutch can selectively connect or disconnect this power train. It is also possible that a second, independent drive propels the wrapping material conveying member, e.g. an electric motor.

In this further embodiment the wrapping material conveying member is driven during the web providing step. As soon as the leading segment is formed downstream of the severing location, the movement of the web yielded by the wrapping material conveying member is stopped and the wrapping material conveying member keeps the clamped leading segment in the web providing position. When the step of starting the wrapping procedure triggers the or the first web injecting step, the wrapping material conveying member is driven again and conveys the clamped web.

The wrapping material conveying member is preferably positioned upstream of the severing location, e.g. between the severing location and a reservoir for wrapping material, such that the wrapping material conveying member always holds a web of wrapping material. Before the web providing step is performed, a loose front part of the web protrudes from the conveying member.

In one embodiment a further wrapping material conveying member, e.g. a web feeding roller with ribs on its circumferential surface, is positioned adjacent to the wrapping material inlet and downstream from the clamping wrapping material conveying device. This further conveying member conveys the web towards the wrapping material inlet after the leading segment has been formed and is kept in the intermediate web providing position. This further conveying member is therefore used in the or at least one web injecting step. Preferably the wrapping material conveying member is also driven while the further conveying member conveys the web—at least until the web has been injected into the bale forming chamber.

In one implementation a distance between the leading segment kept in the web providing position and the further wrapping material conveying member occurs. The further wrapping material conveying member is only used in the or every web injecting step but not in the web providing step and not for holding the leading segment. This implementation makes it possible that the further wrapping material conveying member can be driven in one direction for conveying the web and can be conveyed in the opposite direction for cleaning the wrapping material inlet from debris when no web injecting step is performed. The further wrapping material conveying member can be conveyed in the opposite direction before and/or while the leading segment is kept in the web providing position, in particular while the bale is formed.

It is also possible that a guiding sheet guides the web during the or at least one web injecting step towards the wrapping material inlet. In one implementation the guiding sheet is positioned downstream of the clamping conveying device. In addition to its guiding function this guiding sheet can further prevent the web of wrapping material from dropping on the ground or into a further rotating part of the baler, e.g. into a conveying rotor, or onto a ground-engaging wheel. The guiding sheet can extend in a plane or can comprise an arcuate segment engaging into the wrapping material inlet. Loose material and debris can drop on the ground.

In one implementation the guiding sheet can be moved between a guiding position and a parking position. Moving the guiding sheet into the parking position increases the distance between the guiding sheet and the wrapping material inlet.

In one embodiment of creating the leading segment in the web providing step a web movement sensor measures a value indicative of the distance over which the web of wrapping material is conveyed on its way from the reservoir towards the wrapping material inlet. In one implementation of the movement sensor a counting or sensing roller is rotated by the movement of the web. Or the roller is driven and conveys the web. In both implementations substantially no slippage between the circumferential surface of this roller and the web occurs. The number of revolutions of this roller is counted, e.g. by counting electric or magnetic pulses wherein one pulse or two pulses per roller revolution is generated. This roller can belong to the clamping wrapping material conveying member. It is also possible that the conveying velocity of the web in the web providing step is measured and is used for deriving the length. In one implementation the conveying time is measured whereas the conveying speed is also measured or is given.

In the embodiment with the web movement sensor the wrapping material conveying device conveys the wrapping material while the bale is formed and while the web providing step is performed. The web movement sensor measures the distance over which the web is conveyed. The web is conveyed until the measured distance over which the web is conveyed away from the severing location reaches a given web length threshold. This event triggers the interruption of the web conveying, i.e. the termination of the web providing step. The thereby formed leading segment kept in the web providing position has a measured actual length approximately equal to the given web length threshold. This web length threshold can be given according to the construction and geometry of the bale forming and wrapping apparatus and does not necessarily depend on operating conditions which can change during the bale formation and wrapping. The web length threshold can be selected as long as possible and so short that neither the rotated bale nor the bale forming means contact the leading segment in the web providing position. Thanks to using the web movement sensor the short distance over which the web has to be conveyed in the web injecting step is known by the baler's construction.

According to the invention the web is conveyed past the severing location for forming the leading segment. In one embodiment the web providing step, i.e. the formation of the leading segment, is triggered by an event depending on a parameter of the increasing bale in the bale forming chamber. In one implementation the web providing step is started as soon as a measured dimension of the bale, e.g. the diameter of a round-cylindrical bale, or a further parameter, e.g. the bale weight, reaches a given percentage of the required dimension or an absolute diameter threshold or a further given threshold. In the case of a cuboid bale the bale length is measured. This embodiment enables forming the leading segment as late as possible without requiring more time for the wrapping procedure.

Preferably the web injecting step is triggered and the bale is wrapped in the bale forming chamber when the bale has reached a given required final bale size. In one implementation a bale size sensor measures a value indicative of a dimension of the bale in the bale forming chamber. In the case of a round-cylindrical bale the diameter is measured, in the case of a cuboid bale the length of the pressed string of crop material. As soon as this measured bale dimension reaches a given intermediate bale size threshold, the wrapping material conveying device starts the web providing step, thereby forming the leading segment. This intermediate size threshold is smaller than the given required final bale size. The bale size increases while and after the leading segment is formed as further loose material is injected into the bale forming chamber.

It is also possible that the weight of the bale is measured while the bale is formed and that the web providing step is triggered as soon as the bale weight reaches a given weight threshold. It is also possible that a value indicative of the amount of loose material injected into the bale forming chamber is measured, e.g. in a feeding channel guiding into the bale forming chamber.

According to the invention the web is further conveyed towards the wrapping material inlet after the leading segment has been formed and has been kept in the intermediate web providing position. In one embodiment the or the first web injecting step is started as soon as the bale size has reached a given final bale size threshold or as soon as a further bale completion condition is fulfilled. The injection of further loose material into the bale forming chamber is inhibited until the bale is entirely wrapped. Thanks to the invention the material injection needs only to be interrupted for a shorter time.

In a further embodiment the or the first web injecting step is already started before the bale size has reached this given final bale size threshold. In one implementation the web injecting step is started as soon as the bale size reaches a given threshold or percentage smaller than the final bale size, e.g. when the actual bale size has reached 99% or 99.5% of the required final bale size. In a further implementation a prediction is automatically made when the increasing bale size will reached the given final bale size threshold. This prediction is used for starting the or the first web injecting step. Thanks to the invention the prediction needs only to cover a short future time span, namely the time span needed for conveying the leading edge of the leading segment from the intermediate web providing position to the wrapping material inlet.

In one implementation of the prediction a sequence of values indicative of the current size of the increasing bale in the bale forming chamber is measured. By means of an extrapolation step it is automatically predicted when the bale size will reach the final bale size threshold. The or the first web injecting step is started depending on the result of this extrapolation and on the time required for conveying the web from the web providing position into the bale forming chamber. In addition the mass flow of material conveyed to the bale forming chamber can be measured and used for the prediction.

In one embodiment the bale forming means partially surrounds the bale forming chamber, in particular a drum-shaped bale forming chamber. A round-cylindrical bale is formed and wrapped in this bale forming chamber. The bale forming chamber can also be implemented as a pressing channel and the bale forming means can be implemented as an oscillating pressing piston. A string of pressed loose material is formed in the pressing channel.

In the case of a drum-shaped bale-forming chamber the bale forming means can comprise at least one pressing belt, preferably several parallel (side-by-side) pressing belts. The or every pressing belt partially surrounds the bale forming chamber. In addition to the pressing belt or belts the bale forming means comprises at least one driven starter roller adjacent to a loose material inlet. The bale forming means can also comprise several pressing rollers positioned around the bale forming chamber. The volume of the bale forming chamber can increase or can remain constant during the bale formation.

The wrapping material comprises a net, a plastic sheet, or several strands of twine. The same bale can be wrapped into one kind or two different kinds of wrapping material.

In one implementation the bale forming and wrapping apparatus comprises a casing with a stationary casing part and a movable discharge gate, e.g. a tailgate. The discharge gate can be moved with respect to the stationary casing part into a bale forming position and
into a bale ejecting position.

The bale is formed and wrapped in the bale forming chamber while the discharge gate is in the bale forming position. The wrapped bale can be ejected out of the bale forming chamber while the discharge gate is in the bale ejecting position. The wrapping apparatus can be mounted at the moveable discharge gate or at the stationary casing part.

In one embodiment the bale forming and wrapping apparatus comprises the wrapping material inlet and a separate loose material inlet which also leads into the bale forming chamber. In one implementation the wrapping material inlet occurs between the movable discharge gate and the stationary casing part or is positioned between the stationary casing part and a baler frame. In a further implementation the wrapping material inlet is cut into the stationary casing part.

In both implementations the loose material inlet is positioned in the stationary casing part. Wrapping material is injected through the wrapping material inlet into the bale forming chamber. Loose material to be pressed is injected through the loose material inlet into the bale forming chamber. A distance between these two inlets occurs. In a further embodiment one inlet into the bale forming chamber serves as the wrapping material inlet as well as a loose material inlet.

In one application the bale forming and wrapping apparatus is a part of a vehicle which drives or which is pulled over ground and picks up loose material from the ground, in particular loose agricultural material from a field. This picked-up loose material is conveyed and injected into the bale forming chamber. It is also possible that the loose material is placed on a conveyer which conveys the loose material into the bale forming chamber. The amount of picked-up, conveyed, and injected loose material determines the bale growth rate and can hardly be predicted in advance. Thanks to the invention only few time is used for conveying the web to the wrapping material inlet after the wrapping procedure is triggered.

In one embodiment an inclination sensor measures a value indicative of the inclination of the vehicle being moved over ground. The wrapped bale is ejected out of the bale forming chamber and is deposited on the ground. The event that the bale is ejected is triggered depending on the measured inclination value. This embodiment reduces the risk that the deposited bale rolls away.

In a further application the bale forming and wrapping apparatus is a part of a stationary plant and forms bales from cartridges or recycling material or waste, e.g. The bale growth rate depends on the injection of recycling material which may vary over time.

In one embodiment the bale forming and wrapping apparatus according to the invention is mechanically connected with a further wrapping apparatus comprising a bale support member. The bale is wrapped in the bale forming chamber. The wrapped bale is ejected out of the bale forming chamber and is transferred onto the bale support member, e.g. onto a so-called wrapping table. The entire surface of the bale on the bale support member is wrapped into further wrapping material, in particular into an impermeable plastic sheet. Preferably the bale support member rotates the bale while the bale is wrapped on the bale support member.

These and other aspects of the invention and of the preferred embodiment will be even more apparent from the detailed embodiment as described below and will be elucidated in detail there.

DETAILED DESCRIPTION OF EMBODIMENT

In every embodiment of the invention describe below the invention is used on board of an agricultural harvester which forms round-cylindrical bales from loose agricultural crop material. Every embodiment of the invention as described in the following subsequently creates several round-cylindrical bales in a drum-shaped bale forming chamber, convey a web of wrapping material towards a wrapping material inlet, wrap the formed bales in the bale forming chamber, and eject the wrapped bales.

Figure 1:
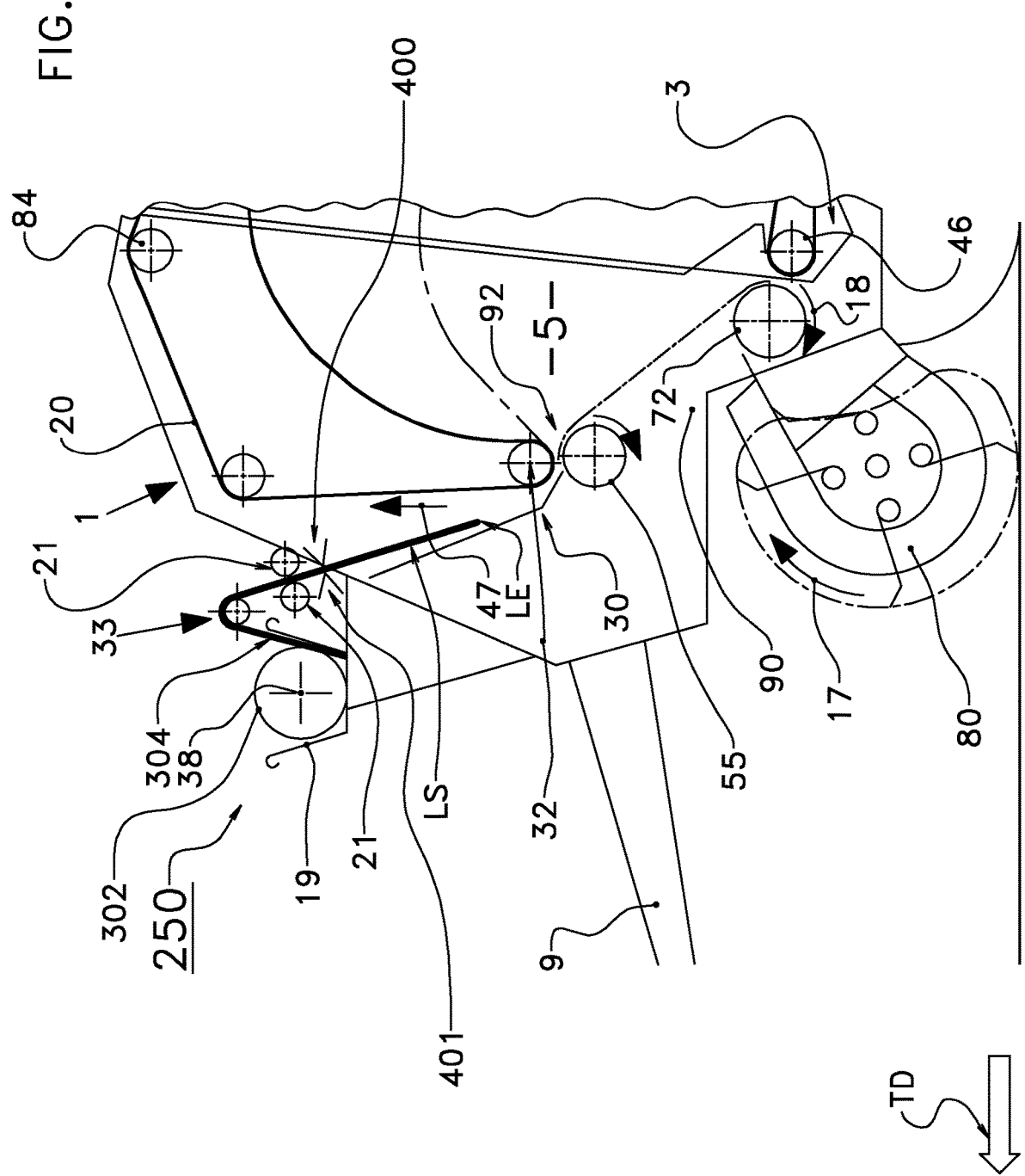
FIG. 1 shows schematically the front part of a round baler according to the invention with the wrapping apparatus mounted at the front housing, with two pulling rollers for clamping and conveying the web, and with a stationary guiding plate for guiding the conveyed web.
Figure 2:
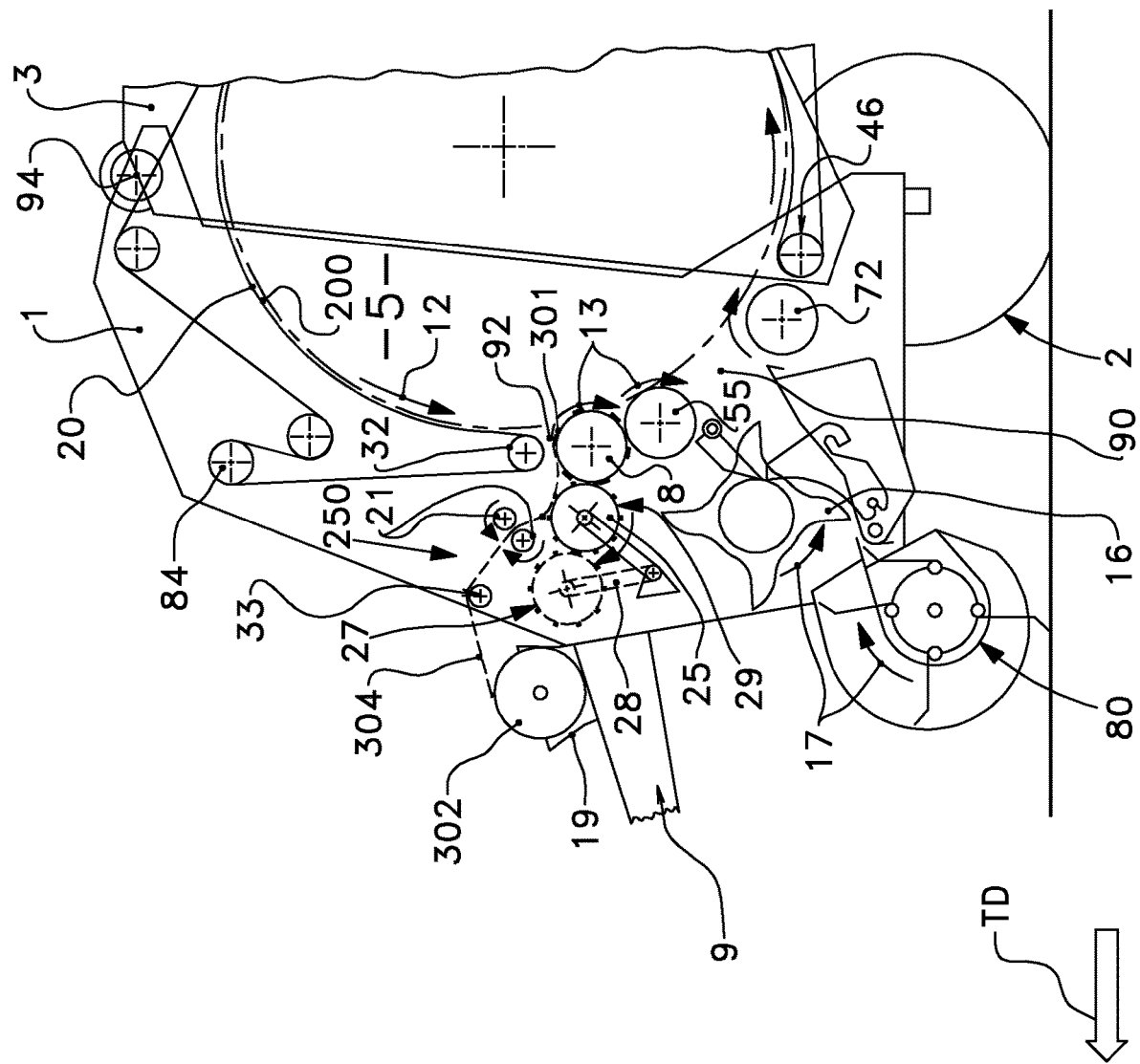
FIG. 2 shows an alternative embodiment for the wrapping apparatus mounted at the front housing comprising two pulling rollers and a rotatable wrapping material feeding roller in place of the guiding sheet of FIG. 1 wherein a situation is shown in which the web has just reached the wrapping material inlet.
Figure 3:
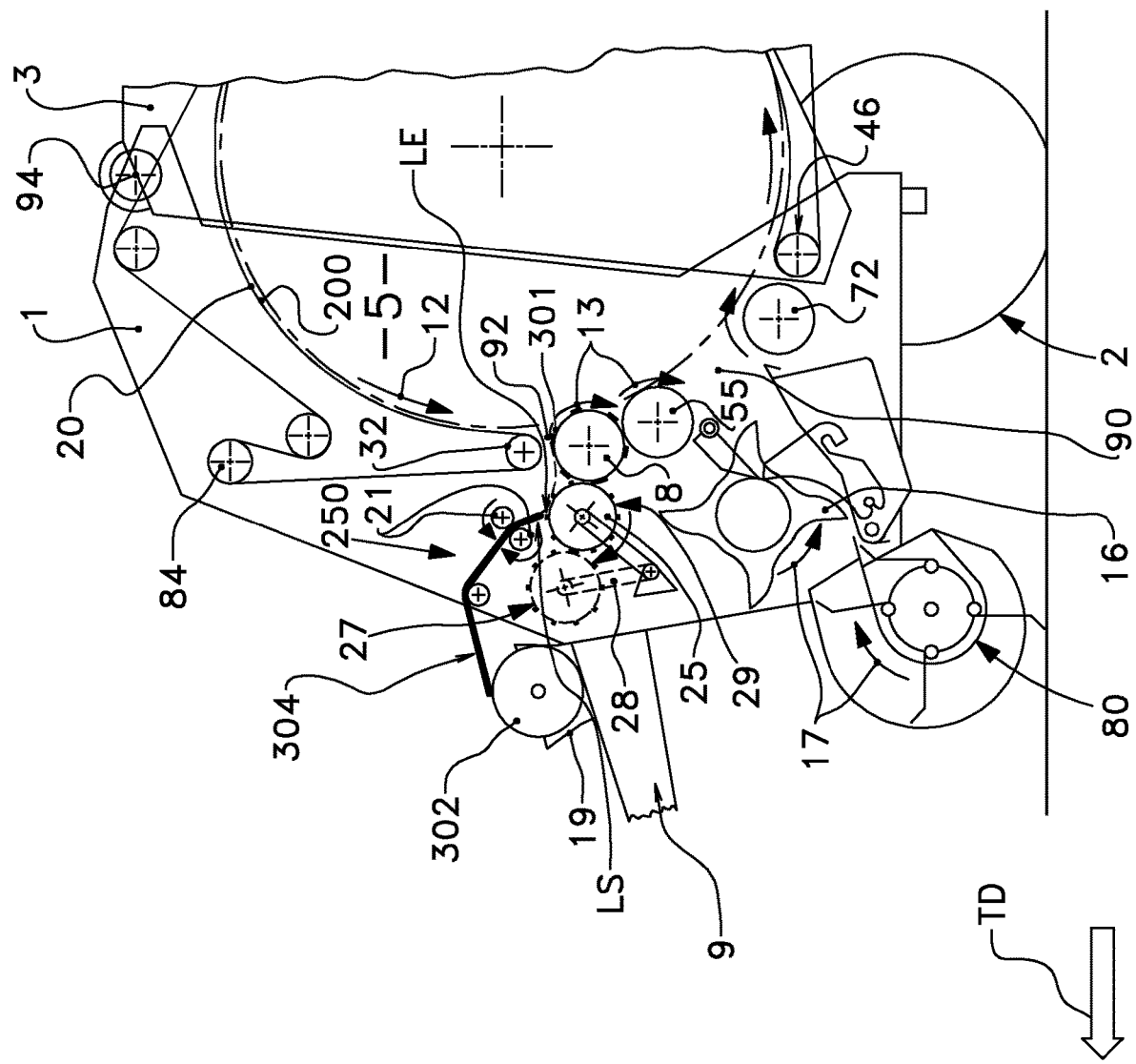
FIG. 3 shows the round baler of FIG. 2 with the leading segment kept in the web providing position, i.e. a situation achieved before that of FIG. 2.
Figure 4:
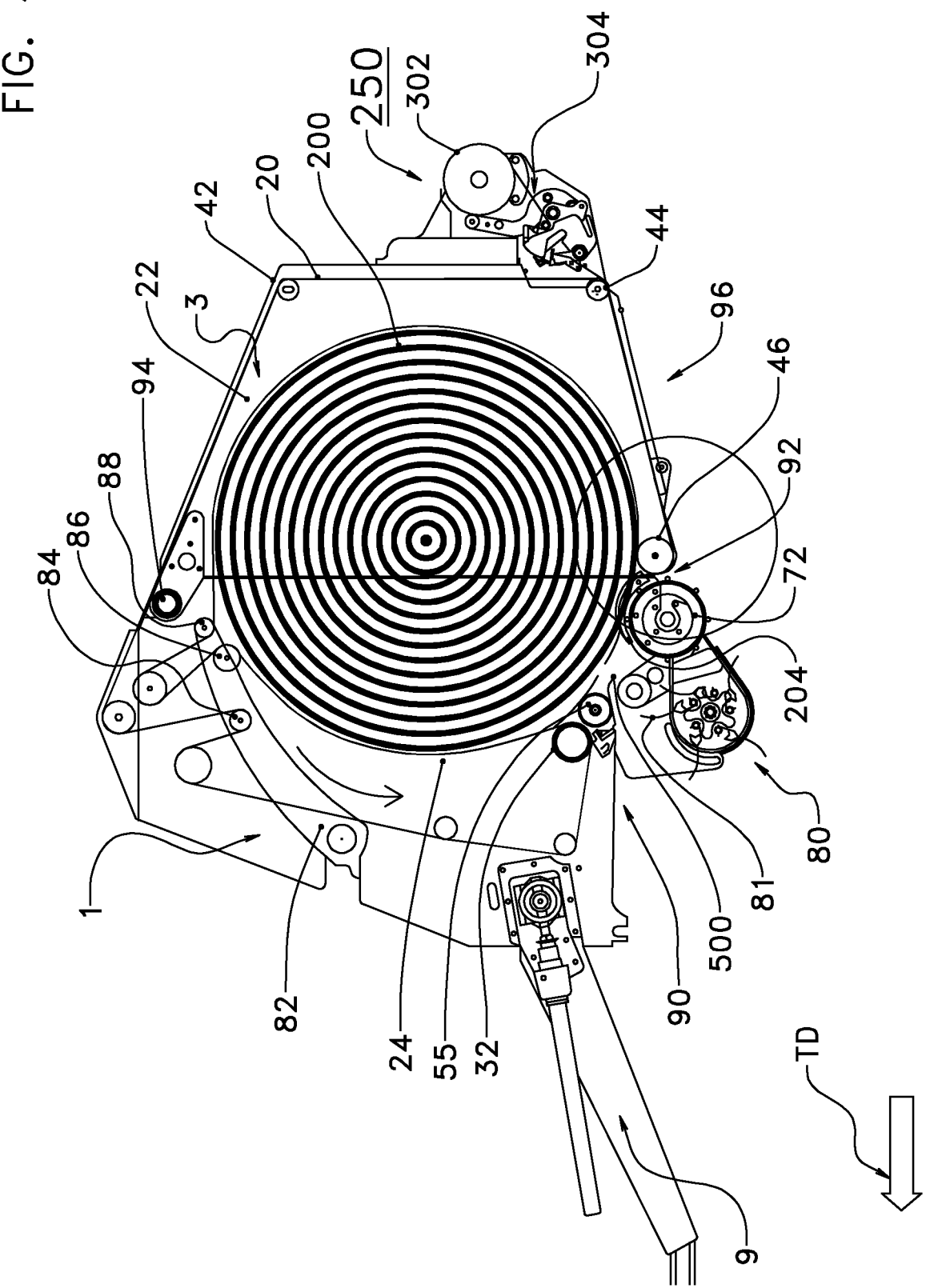
FIG. 4 shows a round baler with the wrapping apparatus mounted at the pivotal tailgate and with a pivotal feeding pan for pressing the web of wrapping material against the pressing belt.

FIG. 1 to FIG. 3 show the front part of a bale forming and wrapping apparatus on which two different embodiments of the invention are implemented. In the embodiments shown in FIG. 1 to FIG. 3 the wrapping apparatus is mounted at the front housing. In the embodiment of FIG. 4, however, the wrapping apparatus is mounted at the pivotal tailgate.

The baler of FIG. 1 comprises the following parts:
- a stationary front housing 1 and a pivotal tailgate 3 (only a small part is shown),
- a towing unit 9,
- a pick-up drum 80 with several spring-mounted tines,
- two driven starter rollers 55, 72 forming the two borders of a crop material inlet 90,
- two belt deflecting rollers 32, 84 mounted at the stationary front housing 1 and guiding the or every pressing belt 20,
- a further deflecting roller 46 for the or every pressing belt 20 mounted at the pivotal tailgate 3,
- at least one driven pressing belt 20 guided around the deflecting rollers 32, 84, 46, and around further rollers, preferably several parallel (side-by-side) pressing belts 20,
- a wrapping apparatus 250 mounted at the stationary front housing 1, and
- a baler control unit (not shown) which receives and processes sensor signals and generates control inputs for the baler actuators, in particular for the actuators of the wrapping apparatus 250.

The wrapping apparatus 250 comprises
- an unrolling station 19 with two shaft stubs 38 for rotatably keeping a supply reel 302 with wrapping material,
- a deflecting roller 33 for a web 304 of wrapping material pulled from the supply reel 302,
- two pulling rollers 21, preferably one driven roller and one idler roller biased against the driven roller, wherein the pulling rollers 21 are positioned downstream from the deflecting roller 33,
- a severing device 400 positioned downstream from the pulling rollers 21, and
- a stationary or moveable guiding sheet 30 for guiding a web 304 of wrapping material.

The front housing 1 carries the starter rollers 55, 72 and the deflecting rollers 32, 84. The two starter rollers 55, 72 and the pressing belts 20 together belong to the bale forming means of the embodiment and provide and surround a drum-shaped bale forming chamber 5. The bale forming chamber 5 is entirely surrounded by the bale forming means except the crop material inlet 90 and a wrapping material inlet 92. This wrapping material inlet 92 is limited from below by the starter roller 55 and limited from above by the pressing belts 20 guided around the deflecting roller 32. The front housing 1 and the tailgate 3 together form a casing for the bale forming means.

A tractor (not shown) pulls the baler in a travelling direction TD. While being moved in the travelling direction TD, the round baler picks up loose crop material from the ground by means of the pick-up unit with the pick-up drum 80 which is rotated in the rotating direction 17. The picked-up crop material is conveyed away from the pick-up unit in a direction opposite to the travelling direction TD and is inserted into the bale forming chamber 5 through the crop material inlet 90 which is positioned between the two starter rollers 55 and 72. The deflecting roller 32 and further rollers (not shown) are driven and drive the pressing belts 20 in the conveying direction 47.

An increasing bale is formed in the bale forming chamber 5 and is rotated by the pressing belts 20 and by the starter rollers 55, 72 (in FIG. 1 anti-clockwise). The increasing diameter of the round-cylindrical bale is permanently measured and monitored, e.g. by measuring the pivoting angle of a tensioning device (not shown) which tends to tension the pressing belts 20.

After the bale in the bale forming chamber 5 has reached a predetermined final bale size (bale diameter), the bale in the bale forming chamber 5 is wrapped into a web 304 of wrapping material. The web 304 is guided around the deflecting roller 33 and is clamped between the two pulling rollers 21. The two pulling rollers 21 permanently clamp the web 304. When being rotated the pulling rollers 21 pull the clamped web 304 from the supply reel 302. Thereby the pulling rollers 21 convey the web 304 towards the wrapping material inlet 92. The guiding sheet 30 guides the web 304 further towards the wrapping material inlet 92. The web 304 is inserted through the wrapping material inlet 92 into the bale forming chamber 5.

The inserted web 304 is clamped between and conveyed by the starter rollers 55, 72 and later by the pressing belts 20 on the one side and by the rotated bale in the bale forming chamber 5 on the other side. The pulling rollers 21 now operate in an idler mode and still clamp the web 304. The moved web 304 rotates the pulling rollers 21. The starter rollers 55, 72 and the belts 20 on the one side and the rotated bale on the other side pull the web 304 from the reel 302. A required number of wrapping material layers are placed around the rotated bale in the bale forming chamber 5. A web movement sensor (to be described below) measures the length of the web 304 pulled from the supply reel 302. The measured web length and the diameter of the bale yields the actual number of web layers placed around the bale.

Afterwards the severing device 400 severs the web 304 of wrapping material at a severing location 401. In one implementation a cutting edge of the severing device 400 penetrates the web 304. The severing location 401 is in every embodiment positioned between the supply reel 302 and the wrapping material inlet 92. In the embodiment of FIG. 1 the severing location 401 is positioned between the pulling rollers 21 and the guiding sheet 30. A leading edge 301 of the remaining web 304 is formed at the severing location 401 and downstream from the pulling rollers 21.

After the web 304 is severed, the wrapped bale is ejected out of the bale forming chamber 5. The ejected wrapped bale is deposited on the ground. For doing so the tailgate 3 is pivoted upwards. After having ejected the wrapped bale, the tailgate 3 is closed again and the baler is ready for forming and wrapping a further bale in the bale forming chamber 5.

The round baler according to the embodiment of FIG. 1 conveys the web 304 of wrapping material as follows to the wrapping material inlet 92:

After the previous bale is wrapped and after the severing device 400 has severed the web 304 of wrapping material, the pulling rollers 21 are no longer rotated and clamp and keep the remaining web without moving the web 304. The leading edge of the web 304 is at the severing location 401.

The round baler starts with the formation of a new bale in the bale forming chamber 5. A bale size sensor (not shown) measures and monitors the increasing diameter of the round bale.

As soon as the measured and monitored bale diameter has reached a given intermediate bale size threshold which is smaller than the required final bale size threshold, the web providing step is triggered. The pulling rollers 21 are driven and convey the remaining and clamped web towards the wrapping material inlet 92.

This web providing step is terminated, i.e. the web movement is interrupted, before the leading edge LE of the web 304 has reached the wrapping material inlet 92. Thereby a leading segment LS of the web 304 is formed. This leading segment LS is positioned downstream from the pulling rollers 21, reaches from the severing location 401 to the leading edge LE, and rests on the guiding sheet 30. After the termination the pulling rollers 21 are not driven and keep the web 304 and thereby also the leading segment LS in an intermediate web providing position. FIG. 1 shows this situation. In one implementation the web providing step is terminated as soon as the leading segment LS has a length equal to the given web length threshold (see below).

Later at least one web injecting step for injecting the web 304 including the leading segment LS into the bale forming chamber 5 is performed, see below.

In one implementation one pulling roller 21 is connected with the driven deflecting roller 32 or with a driven starter roller 55, 72 by means of a power train provided with a controllable clutch. The rollers 32, 55, 72 are continuously rotated. The connected pulling roller 21 is also rotated as long as the power train is closed and thereby establishes a driving connection. The controllable clutch is arranged in this power train. The balers control unit selectively closes and opens this clutch for rotating the pulling roller 21 or for interrupting the drive for this pulling roller 21. In one implementation the clutch is closed and connects the power train until the leading segment LS with the required length is formed. The other pulling roller 21 is an idler roller which is biased against the driven pulling roller by means of a spring, e.g.

In one implementation this web providing step which is performed by the pulling rollers 21 is terminated and the web conveying is interrupted after a given time span has passed.

In a preferred implementation, however, a web movement sensor (not shown) measures the distance over which the remaining web 304 has conveyed past the severing location 401 after the severing device 400 has severed the web 304. In a preferred implementation of the web movement sensor the number of revolutions of one pulling roller 21 is counted. As only little slippage between the web 304 and the clamping pulling rollers 21 occurs, the counted number of revolutions is a value indicative of the distance over which the web 304 is moved. It is possible that the pulling roller 21 rotates an encoder roller (not shown). The number of rotations of this encoder roller is counted. It is also possible that the number of revolutions of the deflecting roller 33 is counted. It is also possible that the conveying velocity and/or conveying time of the web 304 are measured. The baler control unit processes signals from the web movement sensor and terminates the web providing step as soon as the measured web length reaches the given web length threshold.

The leading segment LS is kept in the intermediate web providing position as shown in FIG. 1. This leading segment LS reaches from the severing location 401 downstream of the pulling rollers 21 to the leading edge LE. A part of the leading segment LS rests on the guiding sheet 30. The clamping pulling rollers 21 prevent the web 304 from being moved.

As soon as a given wrapping start condition is fulfilled, the wrapping procedure commences. In one implementation this wrapping start condition is fulfilled as soon as the measured bale diameter reaches a given final bale size threshold. In a further implementation the wrapping start condition is fulfilled shortly before the bale diameter reaches this final bale size threshold. The wrapping start condition is determined such that the bale size reaches the final bale size threshold as soon as the leading edge LE enters the bale forming chamber 5. Preferably no further crop material is injected into the bale forming chamber 5 after the web 304 has reached the inlet 92.

According to the further implementation the wrapping procedure starts before the bale reaches the final bale size threshold. A time span is given such that the future bale size which the bale will have after this time span equals the given final bale size. The wrapping start condition is fulfilled in the beginning of this time span, i.e. as soon as it is predicted that the bale size will reach the final bale size threshold after the time span. According to the prediction the bale size will reach the final bale size threshold after the time span has passed such that the web 304 has to reach the bale forming chamber 5 after this time span and just in the right moment. Thanks to the invention this time span can significantly be shorter than in known balers—the web 304 has to be conveyed over a shorter path. This reduces the risk of a wrong size prediction and the risk that the actual size of the ejected bale differs from the required final bale size.

In the embodiments of FIG. 1 to FIG. 3 the event that the wrapping start condition is fulfilled triggers the step that the pulling rollers 21 are driven again. In one implementation the baler control unit closes the clutch and thereby connects the power train again. By means of the pulling rollers 21 conveying the web 304 including the leading segment LS the or every web injecting step is performed.

FIG. 2 and FIG. 3 show a further embodiment of a bale forming and wrapping apparatus according to the invention with a wrapping apparatus 250 mounted at the front housing 1. Coinciding parts have the same reference signs than in FIG. 1. The crop material inlet 90 is positioned between the starter rollers 55 and 72. In the embodiment of FIG. 2 the wrapping material inlet 92 is positioned between a segment of the pressing belts 20 guided over the deflecting roller 32 and the pressing roller 8 arranged above the starter roller 55. The two starter rollers 72, 55 and the pressing roller 8 are driven in the direction indicated by the arrows 13. Longitudinal ribs are mounted on the circumferential surface of the rollers 8, 55.

Like in the embodiment of FIG. 1, a web 304 of wrapping material is pulled from a supply reel 302 by means of two pulling rollers 21. The web 304 is guided over a deflecting roller 33 positioned between the supply reel 302 and the pulling rollers 21. In contrast to the embodiment of FIG. 1, the baler according to FIG. 2 and FIG. 3 guides the web 304 by means of a driven wrapping material feeding roller 25 positioned outside of the bale forming chamber 5 and downstream from the severing location 401. Several longitudinal ribs are mounted on the circumferential surface of the driven wrapping material feeding roller 25. In this embodiment no guiding sheet 30 is provided. It is also possible to use a feeding roller 25 as well as a guiding sheet 30.

The wrapping material feeding roller 25 is driven in a clockwise direction as indicated by the arrow below the roller 25 (in FIG. 2 clockwise) and conveys the web 304 towards the wrapping material inlet 92. The wrapping material feeding roller 25 conveys the web 304 towards the wrapping material inlet 92 such that the web 304 is further conveyed by the pressing roller 8. FIG. 2 shows a situation in which the leading edge 301 of the web 304 has just entered the bale forming chamber 5 through the wrapping material inlet 92.

According to the invention a leading segment LS is formed as a result of the web providing step and is kept in an intermediate web providing position without moving it. FIG. 3 shows this leading segment LS kept in the intermediate web providing position. The situation shown in FIG. 3 occurs before that of FIG. 2. The leading edge LE of the leading segment LS is kept in a position between the pulling rollers 21 and the wrapping material feeding roller 25 such that the leading segment LS does not touch the wrapping material feeding roller 25. Therefore the feeding roller 25 can be rotated while the leading segment LS is kept without being moved.

In FIG. 1 and FIG. 3 this leading segment LS sags down from the pulling rollers 21 clamping the web 304. In the situation shown in FIG. 3 the pulling rollers 21 are not driven and keep the clamped web 304 with the leading segment LS in the intermediate web providing position. The leading segment LS belongs to a loose end of the web 304 wherein this loose end sags downwards from the pulling rollers 21.

While forming and wrapping the bale 200 first the situation of FIG. 3 occurs and afterwards that of FIG. 2. While a bale 200 is formed in the bale forming chamber 5, the leading segment LS is formed in the web providing step and is kept as shown in FIG. 3. In the situation shown in FIG. 3 loose picked-up crop material is injected into the bale forming chamber. Afterwards the or every web injecting step is performed and the web 304 is injected into the bale forming chamber 5 as shown in FIG. 2.

According to the embodiment of FIG. 2 and FIG. 3 a distance occurs between the leading edge LE of the leading segment LS and the wrapping material feeding roller 25. This embodiment enables an implementation which is shown in FIG. 2 and FIG. 3: The wrapping material feeding roller 25 is rotatably mounted between two pivotal lever arms 28. By this implementation the wrapping material feeding roller 25 can be pivoted between a feeding position 29 and a parking position 27. Both positions are shown simultaneously in FIG. 3. Neither in the position 27 nor in the position 29 the feeding roller 25 touches the leading segment LS kept in the web providing position. The wrapping material feeding roller 25 in the feeding position 29 is shown in continuous lines and the roller 25 in the parking position 27 is shown in dotted lines. When the wrapping material feeding roller 25 is in the parking position 27, a larger gap between the feeding roller 25 and the wrapping material inlet 92 occurs—compared with the feeding position 29. Crop material can drop downwards and cannot cause a jam or congestion in the or adjacent to the wrapping material inlet 92. The wrapping material feeding roller 25 is kept in the parking position 27 until the or the first web injecting step is triggered. The feeding position 29 is taken while the or every web injecting step is performed. The feeding roller 25 is moved back from the feeding position 29 into the parking position 27 after the web 304 has been injected into the bale forming chamber 5 and is clamped between the rotated bale and the bale forming means.

FIG. 4 shows an alternative embodiment of a baler according to the invention. Coinciding parts have the same reference signs than in FIG. 1 to FIG. 3. In the embodiment of FIG. 4 the wrapping apparatus 250 is mounted at the pivotal tailgate 3 and not at the stationary front housing 1. An unrolling station rotatably holds the supply reel 302 and is mounted at the tailgate 3.

A web 304 of wrapping material is pulled from the supply reel 302 and is conveyed around the tailgate 3 towards a wrapping material inlet 92. This wrapping material inlet 92 is positioned below the bale forming chamber 5 and between a starter roller 72 mounted at the front housing 1 and
a deflecting roller 46 mounted at the tailgate 3.

The web 304 of wrapping material is guided from the supply reel 302 to the wrapping material inlet 92 through a web conveying path. A part of this path is positioned above a feeding pan 96 mounted at the tailgate 3 and below the bale forming chamber 5 in which a bale 200 is formed.

Crop material is injected into this bale forming chamber 5 through a crop material inlet 90 positioned between the starter roller 72 and a further driven starter roller 55 also mounted at the front housing 1. The pressing belts 20 are guided around the deflecting rollers 42, 44, 46 mounted at the tailgate 3, around a deflecting roller 32 mounted at the front housing 1, and around moveable deflecting rollers 84, 86, 88 mounted on the free end of a pivotal tensioning device 82 with at least two arms, namely a left arm and a right arm. The increasing bale 200 tends to increase the bale forming chamber 5. The pressing belts 20 tend to pivot the tensioning device 82 against the force of a retaining device (not shown). A pivoting angle sensor (not shown) measures the current pivoting angle of the tensioning device 82. This measured pivoting angle is a value indicative of the bale size.

Figure 5:
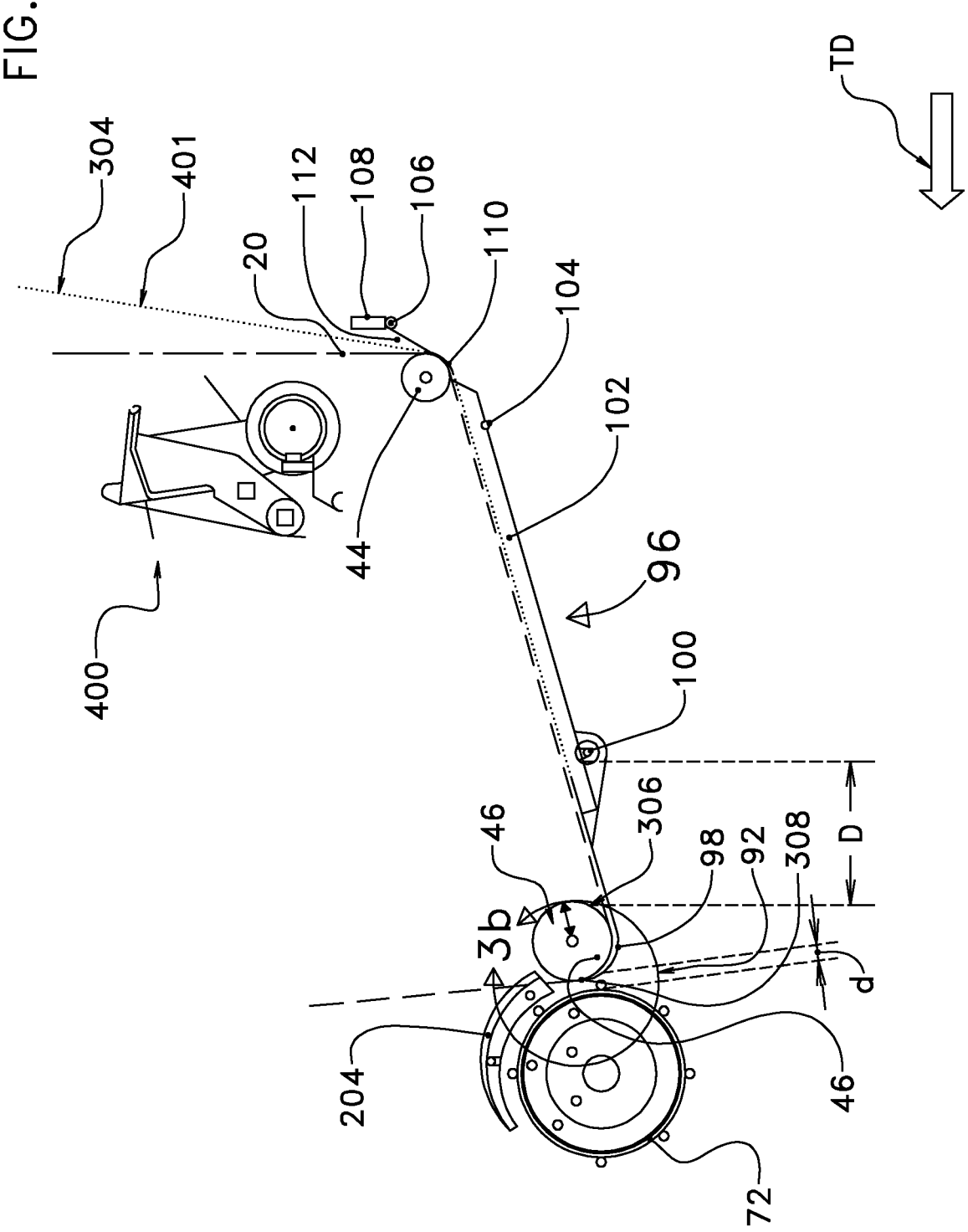
FIG. 5 shows the wrapping material feeding pan of FIG. 4 in a detailed view.

FIG. 5 shows the wrapping material feeding pan 96 in a detailed view. In FIG. 5 the width d of the wrapping material inlet 92 is shown. The feeding pan 96 and the outer surface of the pressing belts 20 together form a funnel 112 for the web 304 of wrapping material. This funnel 112 begins in the top edge 110 of the feeding pan 96 and ends near the wrapping material inlet 92.

The feeding pan 96 can be pivoted around a pivoting axle 100 (perpendicular to the drawing plane of FIG. 5) between a conveying position and a holding position. The axle 100 is positioned near the front edge of the pan 96. Three traversal reinforcing bearings 102, 104, 106 carry the feeding pan 96 from below. An actuator 108 is mounted at the rear traversal reinforcing bearing 106 and can pivot the feeding pan 96 around the pivoting axle 100.

In one implementation the actuator 108 comprises a spring biasing the pivotal feeding pan 96 against the outer surface of the pressing belts 20, i.e. into the conveying position. A further actuator tends to pivot the pan 96 away from the belts 20 against the force of this spring, i.e. into the holding position. In one implementation the pan 96 is locked in the holding position. For moving the pan 96 into the conveying position, the pan 96 is released and the spring 108 pivots the pan 96 upwards. It is also possible that the spring tends to move the pan 96 into the holding position and the further actuator can move the pan 96 against the spring force into the conveying position. It is also possible that no spring is provided and the actuator 108 can pivot the pan 96 in both directions.

The feeding pan 96, the bearings 102, 104, 106 and the actuator 108 belong to the wrapping material opposing member of this embodiment and can be pivoted around the axle 100 between a conveying position and a holding position. In the holding position a distance between the feeding pan 96 and the pressing belts 20 occurs. A web 304 of wrapping material can be inserted into the funnel 102 being in the holding position and does not touch the pressing belts 20.

In the conveying position the upper rear edge 110 of the feeding pan 96 is pressed against the outer surface of the pressing belts 20, e.g. by the spring of the actuator 108. The feeding pan 96 being in the conveying position presses a web 304 of wrapping material against the outer surface of the pressing belts 20. After the web 304 has been inserted into the funnel 112, the pressing belts 20 are permanently driven and convey the web 304 through the funnel 112 towards the wrapping material inlet 92 (in FIG. 5 from right to left). The conveyed web 304 is inserted through the wrapping material inlet 92 into the bale forming chamber 5. A wedge 204 is mounted at a side panel of the bale forming chamber 5 and ensures that the web 304 has a sufficient width for covering the entire circumferential surface of the bale 200.

A distance D occurs between
the pivoting axle 100 of the feeding pan 96 and
the wrapping material inlet 92 between the deflecting roller 46 and the starter roller 72.

This distance D is bridged by a combat-shaped guide 98 which is mounted in a cantilevered fashion at the pivoting axle 100 and is made of an elastic material. This combat-shaped guide 98 guides the web 304 from below in an upper direction and thereby against the pressing belts 20. The front edge 308 of the guide 98 engages into the wrapping material inlet 92. The inserted web 304 engages the circumferential surface of the bale 200 in a place 212, cf. FIG. 6.

Figure 6:
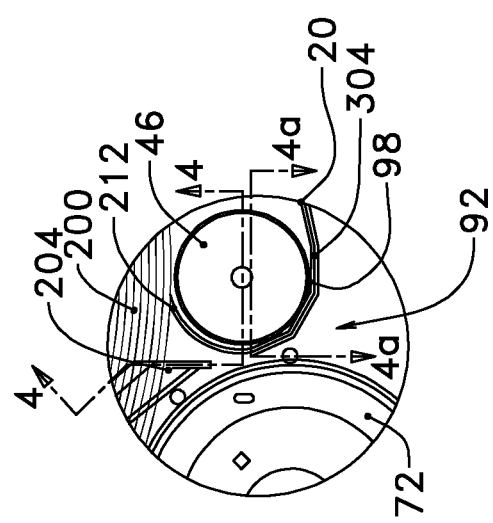
FIG. 6 shows the area 3b of FIG. 5 around the wrapping material inlet.
Figure 7:
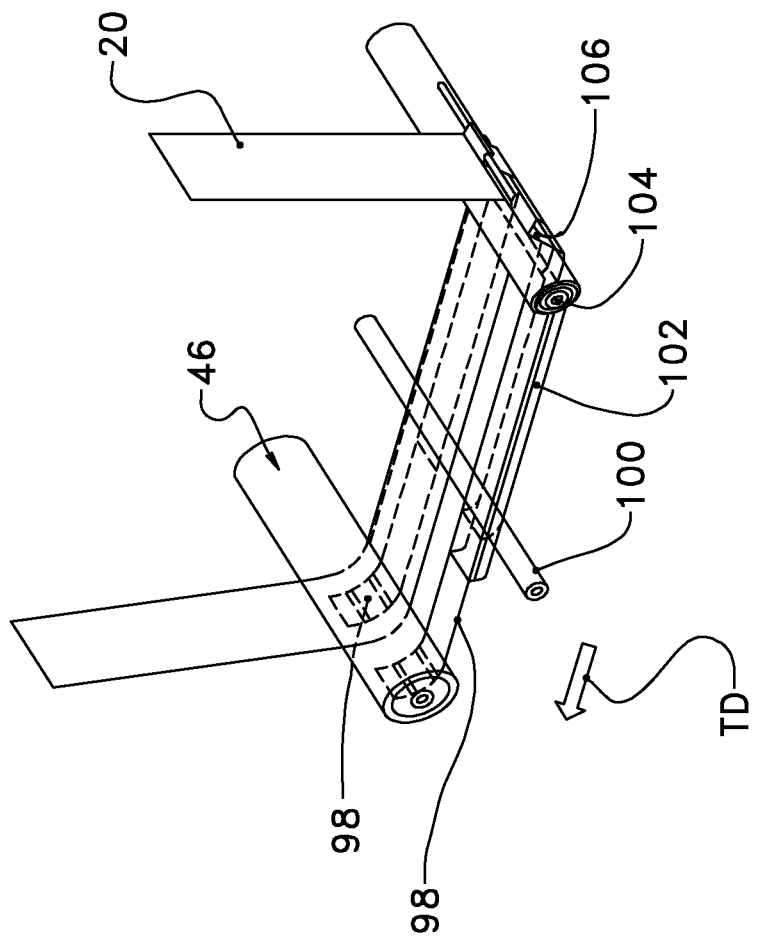
FIG. 7 shows the combat-shaped guide of the wrapping material feeding pan of FIG. 4 positioned adjacent to the wrapping material inlet.

FIG. 6 and FIG. 7 show this guide 98 in detail. FIG. 6 shows the segment 3b of FIG. 5 in detail. FIG. 7 shows one pressing belt 20 in the guide 98 in a perspective view. In FIG. 5 to FIG. 7 the travelling direction TD as well as the belt conveying direction is from right to left.

FIG. 7 shows schematically
the elastic combat-shaped guide 98,
one pressing belt 20 (the other pressing belts are omitted),
the deflecting roller 46 at the tailgate 3,
the pivoting axle 100, and
two traversal bearings 104, 106.

Figure 8:
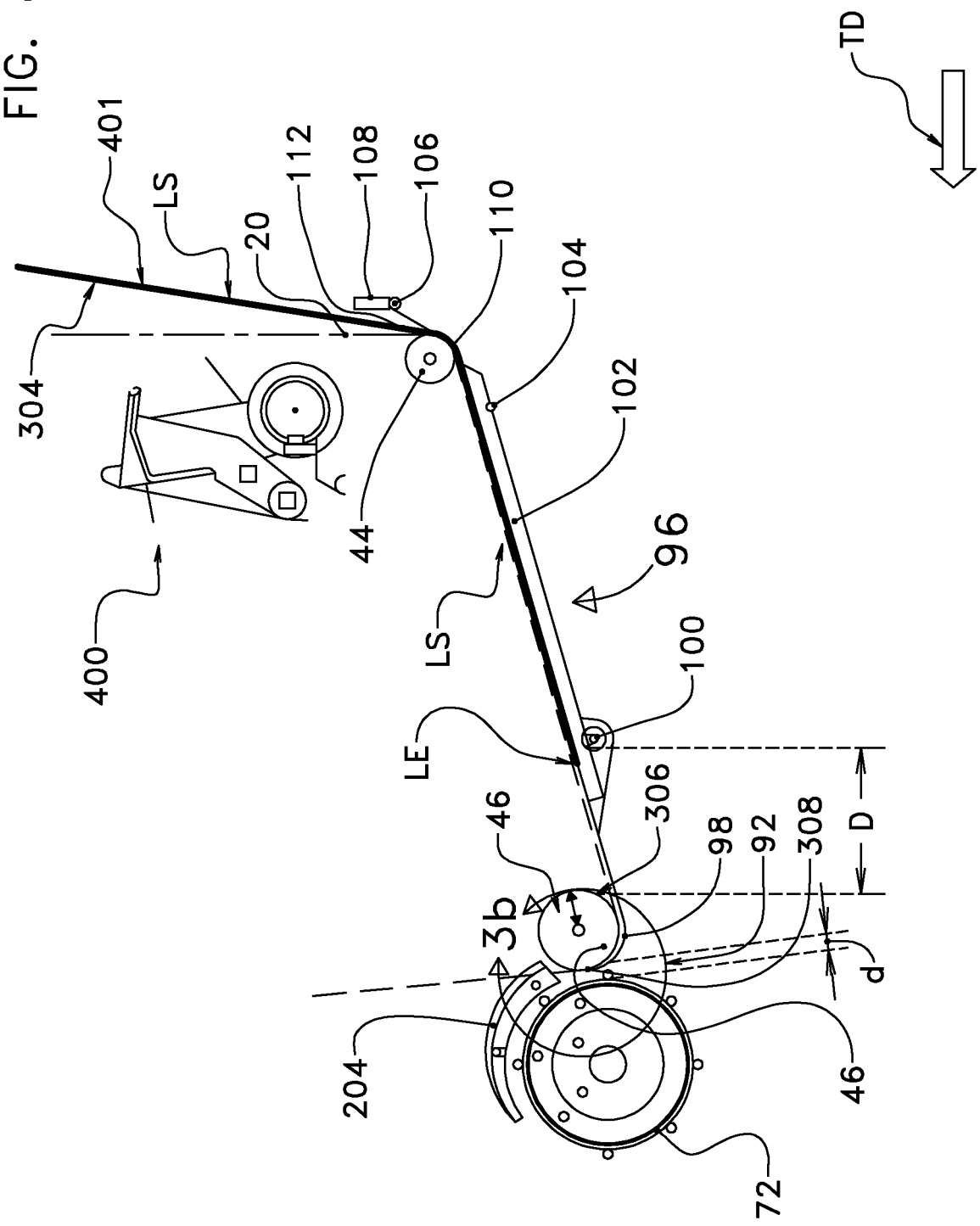
FIG. 8 shows the wrapping material feeding pan of FIG. 5 keeping a leading segment in the web providing position.

FIG. 8 shows the arrangement of FIG. 5 with a leading segment LS of the web 304 kept in the intermediate web providing position. The leading edge LE of the leading segment LS is approximately above the pivoting axle 100. The leading segment LS extends from the severing position 401 around the deflecting roller 44 to the leading edge LE. The part of the leading segment LS reaching from the deflecting roller 44 to the leading edge LE of the leading segment LS is kept in the funnel 112. In the situation shown in FIG. 8 the feeding pan 96 is in the holding position such that a distance between the leading segment LS and the outer surface of the pressing belt 20 occurs. The feeding pan 96 belongs to the wrapping material opposing member being in the holding position and keeps the leading segment LS in the intermediate web providing position. The or every pressing belt 20 is permanently conveyed. Thanks to the distance between the pressing belts 20 and the feeding pan 96 the leading segment LS is kept without moving it.

Figure 9:
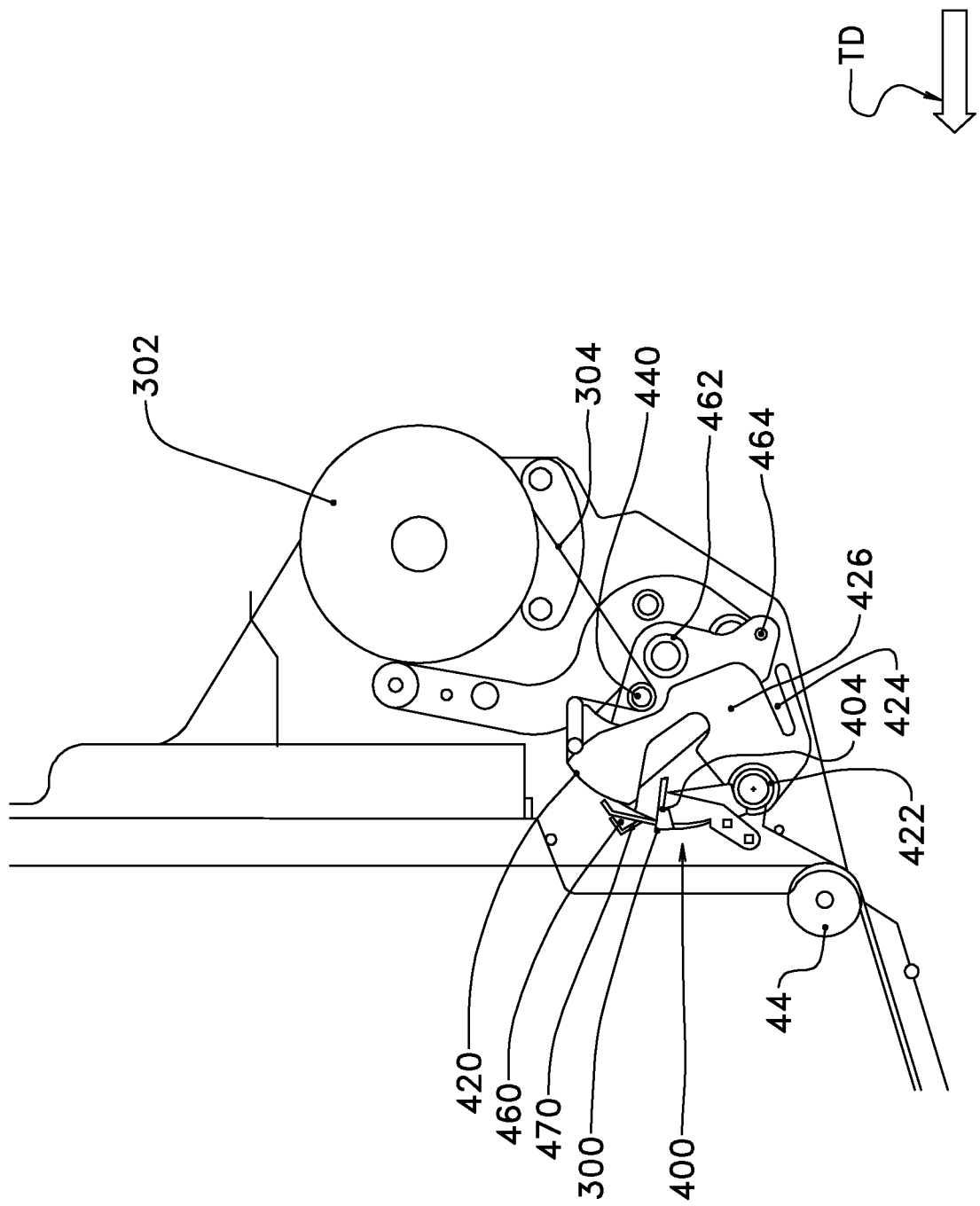
FIG. 9 shows the wrapping apparatus of FIG. 4 mounted at the tailgate in a detailed view.

FIG. 9 shows the wrapping apparatus 250 mounted at the tailgate 3 in a detailed view. A web 304 of wrapping material extends from the supply reel 302 to the leading edge 300. This web 304 is guided around a net spreader roll 440 and over a net pan 420. In the embodiment the web 304 is held against a stationary knife 400 by a cross member 470 of a driver 460. The web 304 remains in this position until the or the first web injecting step is performed. The net pan 420 can rotate around the pivot tube 422.

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

LIST OF REFERENCE SIGNS

| | |
|---|---|
| 1 | stationary front housing of the baler, belongs to a casing for the bale forming chamber 5 |
| 2 | ground-engaging wheels of the baler |
| 3 | pivotal tailgate of the baler, belongs to a casing for the bale forming chamber 5 |
| 5 | bale forming chamber provided by the pressing belts 20 and the starter rollers 55, 72 |
| 8 | driven pressing roller below the wrapping material inlet 92 |
| 9 | towing unit of the baler |
| 12 | conveying direction of the or every pressing belt 20 |
| 13 | rotating direction of the starter rollers 8, 55 |
| 16 | conveying rotor, engages into the feeding channel |
| 17 | rotating direction of the pick-up unit 80 and the conveying rotor 16 |
| 18 | rotating direction of the starter roller 72 |
| 19 | unrolling station for rotatably keeping the supply reel 302 |
| 20 | pressing belts |
| 21 | pulling rollers for clamping the web 304 |
| 22, 24 | sections of the pressing belts 20 |
| 25 | pivotal driven wrapping material feeding roller adjacent to the wrapping material inlet 92 |
| 27 | parking position of the pivotal wrapping material feeding roller 25 |
| 28 | pivotal lever arm for the wrapping material feeding roller 25 |
| 29 | feeding position of the pivotal wrapping material feeding roller 25 |
| 30 | guiding plate for the web 304 |
| 32 | deflecting roller for the pressing belts 20, drives the pressing belts 20 |
| 33 | deflecting roller for the web 304 |
| 38 | shaft stub for holding the supply reel 302 |
| 42, 44 | deflecting rollers mounted at the tailgate 3 and for guiding the pressing belts 20 |
| 46 | deflecting roller adjacent to the wrapping material inlet 92 and mounted at the tailgate 3 for guiding the pressing belts 20 |
| 47 | direction in which the pressing belts 20 are moved |
| 55 | starter roller, delimits the crop material inlet 90 from above |
| 72 | starter roller, delimits the crop material inlet 90 from below |
| 80 | pick-up unit with several pick-up tines 81 |
| 81 | pick-up tines of the pick-up unit 80 |
| 82 | tensioning device for pressing belts 20, carries the deflecting rollers 84, 86, 88 |
| 84, 86, 88 | deflecting rollers for the pressing belt 20, mounted on the tensioning device 82 |
| 90 | crop material inlet, positioned between two starter rollers |
| 92 | wrapping material inlet, arranged between the starter roller 72 and the deflecting roller 46 |
| 94 | pivoting axis of the tailgate 3 with respect to the front housing 1 |
| 96 | feeding pan for guiding the web 304, limits the funnel 112, is pivoted around the axle 100 |
| 98 | combat-shaped guide for wrapping material, mounted in a cantilevered fashion at the pivoting axle 100 |
| 100 | pivot axle for the pivotal guiding sheet 98 |
| 102 | supporting frame for the combat-shaped guide 98 |
| 104 | traversal reinforcing bearing |
| 106 | further traversal reinforcing bearing |
| 108 | actuator attached to traversal reinforcing bearing 106, rotates the feeding pan 96 around the pivot axle 100 |
| 110 | top edge of the feeding pan 96 |
| 112 | funnel formed between the baler belts 20 and the feeding pan 96 |
| 200 | bale to be wrapped in the bale forming chamber 5 |
| 204 | wedge at side panel |
| 212 | place where the web 304 of wrapping material engages the bale 200 |
| 250 | wrapping apparatus with the supply reel 302 and the severing device 400 |
| 300 | leading edge of the web 304 before the leading segment LS is formed |
| 301 | leading edge of the web 304 when entering the bale forming chamber 5 |
| 302 | supply reel for wrapping material |
| 304 | web of wrapping material |
| 308 | front edge of the guide 98 |
| 400 | severing device for severing the web 304 |
| 401 | severing location at which the severing device 400 severs the web 304 |

| | |
|---|---|
| 404 | spring of the severing device 400 |
| 420 | net pan for pressing the web 304 against the stationary knife 400 |
| 424 | slot in the net pan 420 |
| 426 | plate |
| 464 | drive roller |
| 440 | net spreader roller |
| 460 | driver for the web 304 of wrapping material |
| 462 | pivot tube for the driver 460 |
| 470 | cross member of the driver 460 |
| 500 | guide below the starter roller 55, guides wrapping material toward the starter roller 72 and prevents the wrapping material from being engaged by the pick-up unit 80 |
| d | width of the wrapping material inlet 92 |
| D | distance between the pivot axle 100 of the pan 96 and the deflecting roller 46 |
| LE | leading edge of the leading segment LS |
| LS | leading segment of the web 304 kept in the web providing position |
| TD | travelling direction of the baler |

The invention claimed is:

1. A method for forming and wrapping a bale, wherein the method is performed by a bale forming and wrapping apparatus comprising:
a material injecting device;
a bale former providing a bale forming chamber; and
a wrapping apparatus,
wherein the wrapping apparatus comprises:
a wrapping material conveyor comprising pulling rollers; and
a severing device for severing a wrapping material at a severing location,
wherein the method comprises the steps of:
injecting loose material into the provided bale forming chamber with the material injecting device;
forming the bale from the injected loose material in the bale forming chamber with the bale former;
drivingly conveying a web of wrapping material towards a wrapping material inlet, the step of conveying the web towards the wrapping material inlet comprising a web providing step in which the pulling rollers drivingly convey the web of wrapping material past the severing location and towards the wrapping material inlet, wherein, as a result of the web providing step, the web of wrapping material is lengthened to form a leading segment of the web downstream of the severing location,
interrupting the driven conveying of the web after the web providing step, wherein the step of interrupting causes an event that the leading segment is kept in an intermediate web providing position between the severing location and the wrapping material inlet without conveying the leading segment,
wherein the web providing step and the step of keeping the leading segment are performed while loose material is injected into the bale forming chamber, and
wherein, after the step of interrupting, at least one web injecting step is performed in which the wrapping material conveyor further conveys the web including the leading segment towards the wrapping material inlet;
injecting the conveyed web through the wrapping material inlet into the bale forming chamber;
wrapping the bale in the bale forming chamber into the injected web; and
severing the web with the severing device at a severing location positioned outside of the bale forming chamber such that a remaining web of wrapping material beginning at the severing location is created by severing the web.

2. The bale forming and wrapping method according to claim 1, wherein the first web injecting step is triggered by the event that the bale in the bale forming chamber has reached a given final bale size, and
wherein the web providing step and the step of keeping the leading segment in the intermediate web providing position are performed before the bale size has reached the given final size.

3. The bale forming and wrapping method according to claim 1, further comprising the step of:
measuring, at least during the web providing step, a value indicative of the distance over which the web of wrapping material is conveyed towards the wrapping material inlet,
wherein the step of interrupting the conveying of the web is triggered by the event that the measured value for the conveying distance reaches a given web length threshold.

4. The bale forming and wrapping method according to claim 1, wherein the distance over which the web is conveyed during the web providing step for forming the leading segment is larger than the distance over which the web is conveyed after the interruption and until the web reaches the wrapping material inlet, and
wherein the wrapping material inlet is defined between a pair of rollers, and during the step of interrupting, the formed leading segment is kept in the intermediate web providing position without reaching the pair of rollers.

5. The bale forming and wrapping method according to claim 1, wherein the method comprises the further step of measuring a value indicative of the size of the bale in the bale forming chamber while the bale is formed in the bale forming chamber, and
wherein the web providing step is triggered by the event that the measured value for the bale size reaches a given intermediate bale size threshold.

6. The bale forming and wrapping method according to claim 5, wherein the first web injecting step is triggered by a wrapping start condition such that the conveyed web reaches the wrapping material inlet when the size of the bale in the bale forming chamber has reached a given final bale size, and
wherein the intermediate bale size threshold is smaller than the final bale size.

7. The bale forming and wrapping method according to claim 6, wherein the first web injecting step is triggered before the size of the bale reaches the final bale size.

8. The bale forming and wrapping method according to claim 1, wherein the wrapping material conveyor comprises a wrapping material opposing member being movable between a conveying position and a holding position,
   wherein the web providing step comprises the step of the bale former and the wrapping material opposing member being in the conveying position jointly clamp and convey the web,
   wherein the step that the conveying is interrupted comprises the of moving the wrapping material opposing member from the conveying position into the holding position in which a distance between the bale former and the wrapping material opposing member occurs, and the wrapping material opposing member keeps the formed leading segment in the intermediate web providing position.

9. The bale forming and wrapping method according to claim 8, wherein the or at least one web injecting step comprises the of moving the wrapping material opposing member back into the conveying position, and the bale former and the wrapping material opposing member again clamp the web and convey the web towards the wrapping material inlet, thereby performing the or at least one web injecting step.

10. The bale forming and wrapping method according to claim 1, wherein the wrapping material conveying device comprises:
   a wrapping material conveyor positioned outside of the bale forming chamber; and
   a drive for moving the wrapping material conveying member,
   wherein the web providing step comprises the steps of:
   activating the drive; and
   conveying the web with the driven wrapping material conveying member, thereby forming the leading segment, and
   wherein the step that the conveying of the web is interrupted comprises the step of deactivating the drive for the wrapping material conveyor.

11. The bale forming and wrapping method according to claim 10, wherein the wrapping material conveyor comprises a further wrapping material conveyor positioned between the wrapping material conveyor and the wrapping material inlet,
   wherein the step that the conveying of the web is interrupted comprises the step of interrupting the driving of the wrapping material conveyor before the web of wrapping material reaches the further wrapping material conveyor such that a distance between the leading segment kept in the web providing position and the further wrapping material conveyor occurs, and
   wherein the at least one web injecting step comprises the step that the further wrapping material conveying member conveys the web.

\* \* \* \* \*